United States Patent [19]

Judge

[11] 4,274,093
[45] Jun. 16, 1981

[54] KEYBOARD-DISPLAY COMBINATION

[75] Inventor: John F. X. Judge, Yorktown Heights, N.Y.

[73] Assignee: Technicon Instruments Corporation, Tarrytown, N.Y.

[21] Appl. No.: 15,018

[22] Filed: Feb. 26, 1979

[51] Int. Cl.³ .............................................. G06F 3/14
[52] U.S. Cl. ................................ 340/712; 340/365 R; 340/718
[58] Field of Search ............... 340/712, 365 C, 365 R, 340/365 UL, 718, 378.3, 378.4

[56] References Cited

U.S. PATENT DOCUMENTS

| | | | |
|---|---|---|---|
| 3,158,317 | 11/1964 | Alexander | 340/712 |
| 3,495,232 | 2/1970 | Wagner | 340/712 |
| 3,757,322 | 9/1973 | Barkan et al. | 340/712 |
| 3,971,013 | 7/1976 | Challoner et al. | 340/712 |
| 4,032,931 | 6/1977 | Haker | 340/712 |

*Primary Examiner*—Marshall M. Curtis
*Attorney, Agent, or Firm*—S. P. Tedesco

[57] ABSTRACT

A keyboard is constructed as an integral member of a display screen. The keyboard comprises a number of keys which are back-lighted upon the screen when they are enabled, but which are otherwise invisible to the viewer when disabled. When a key is depressed, the lit keyboard is reconfigured, a new set of keys enabled, and a system function is performed.

10 Claims, 6 Drawing Figures

KEYBOARD-DISPLAY COMBINATION

FIELD OF THE INVENTION

This invention relates to a novel keyboard and display combination for a system or machine and, more particularly, to a keyboard-display combination which provides numerous system operational advantages.

BACKGROUND OF THE INVENTION

Most computerized equipments and machinery feature a data input device, such as a keyboard, and a display for providing output information to the operator. It is desirable to make these types of equipments less complex and more compact. Therefore, it is contemplated by this invention to provide an integral keyboard-display combination.

In addition, it is also desirable in such computerized equipments to provide a more reliable data input device which minimizes human error. Often, an operator is confused by the many choices of keys which are available to him during the course of operating the machine. The present invention, therefore, has placed the keyboard and display combination under computer control. Only those keys which pertain to a routine which is currently being performed, will be enabled and visually displayed on the screen. Those keys which do not pertain to such routine are not displayed on the screen and cannot be initiated. After initiation of a current operation, the computer will reconfigure the keyboard, such that only new keys which were lit and enabled will be those which are relevant to a subsequent routine. Thus, the operator will be less likely to make a mistake in operating the system featuring the presention invention.

SUMMARY OF THE INVENTION

The invention pertains to a keyboard-display combination featuring a screen and a series of keys which are functionally and structurally integral with the screen. When a number of keys are not relevant to a current operation or program routine, the keys are disabled so that the operator cannot depress them by mistake. In addition, these keys are caused to become invisible to the viewer when they are disabled, so that operator confusion is minimized. When a key becomes relevant to a current function of the machine, it is both enabled and becomes visible on the screen.

After a key is depressed, it initiates an intended program or routine, and it enables and displays subsequent keys for initiating only selected program routines, which should be subsequently performed by the equipment, on a selective basis.

To accomplish the above, the keys comprise designated areas upon the screen. The screen is flexible, so that these areas can be depressed. The keys are enabled by the machine operation or program, and transparent areas of the keys are back-lighted by individual lamps upon the screen. Each key has a contact switch disposed behind the screen which is actuated when the screen is depressed. Concurrently therewith, the switch has associated means for enabling certain other ones of the keys as well as performing its assigned system funtion.

This keyboard-display combination provides a more reliable and error-free machine operation, while reducing machine parts, machine complexities and costs.

It is an object of the invention to provide an improved keyboard and display by combining them both structurally and functionally;

It is another object of this invention to provide a keyboard-display combination that is more versatile, error free, and reliable;

It is still another object of the invention to provide a keyboard-display combination that is more compact, less complex, and which has fewer parts.

These and other objects of this invention will become more apparent and will be better understood with reference to the following detailed description taken in conjunction with the accompanying drawings in which:

DETAILED DESCRIPTION

Figure 1:
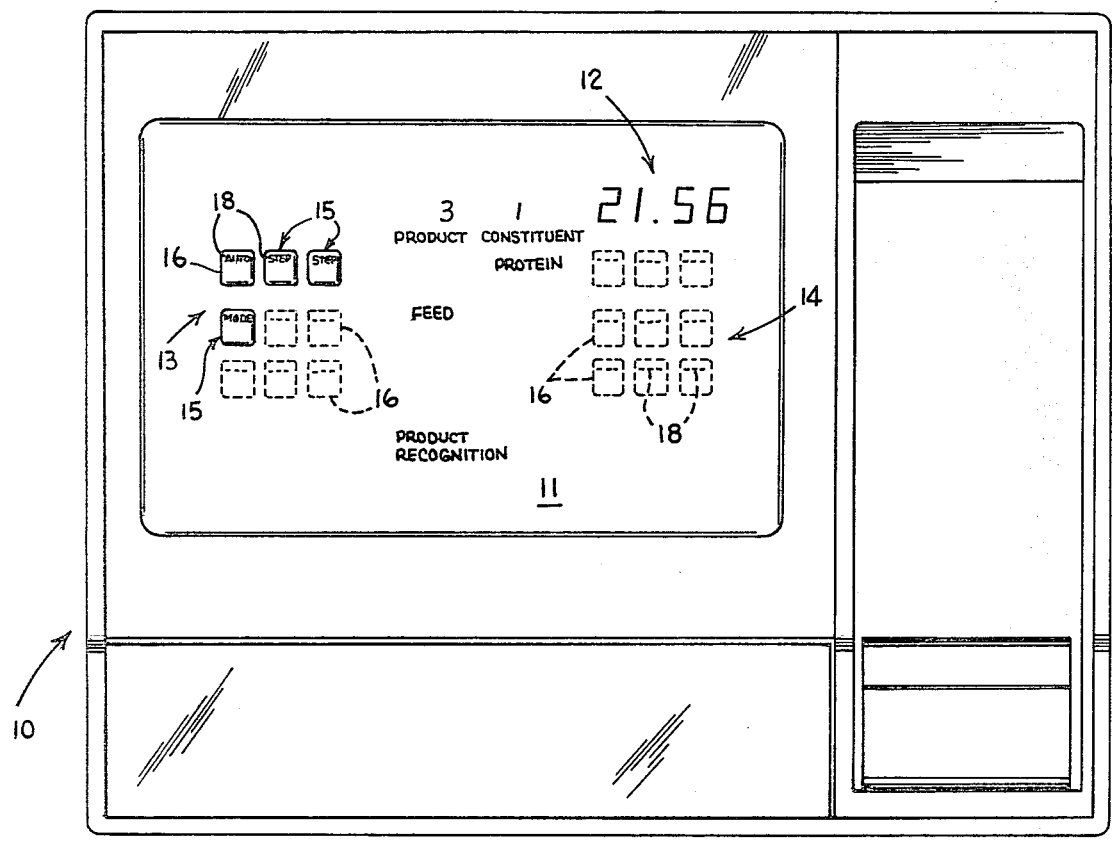
FIG. 1 is a perspective view of the keyboard-display combination of this invention.

Referring now to FIG. 1, a computerized machine 10 is shown with a screen 11 having an extended geometry representing the front panel of the keyboard-display combination of this invention. The screen 11 is generally opaque, but has an illuminative output display area 12 and two illuminative input key display areas 13 and 14, respectively. Each key display area contains a plurality of keys 15, defined by transparent or translucent outlines or silhouettes 16 and labels 18. The screen is generally opaque, so that input keys 15 which are not illuminated as depicted by dotted lines are usually not visible to the viewer. However, the screen has transparent portions 16 and 18, which when illuminated define the individual areas for keys 15. Silhouettes 16 and labels 18 for each key 15 are back-lighted upon screen 11. The screen 11 is flexible, so that each key 15 can be depressed by a finger or an operator. Depression of a key 15 will result in shorting a contact switch 19 (FIG. 4) located behind each key 15 of the screen 11.

The shorted switch 19 will initiate the intended machine function or program routine, while enabling and lighting certain other ones of keys 15. The newly lighted keys 15 may be located in either display area 13 or 14, respectively, depending upon whether a follow-up input of a current routine is needed, or whether an entirely new routine or function is required.

Figure 2:
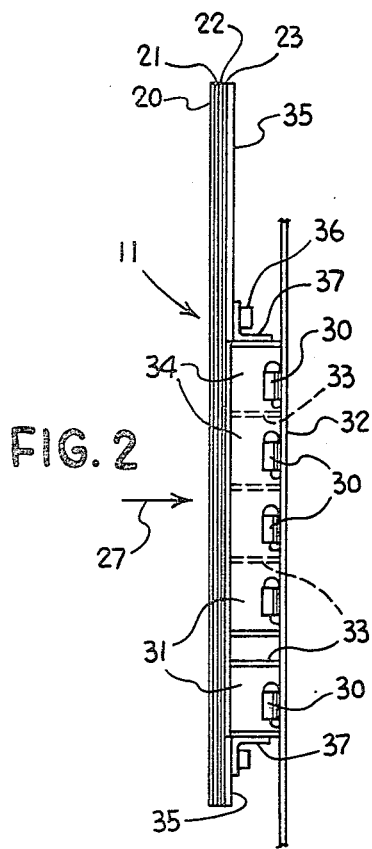
FIG. 2 is a sectional side view of the keyboard-display combination shown in FIG. 1.
Figure 4:
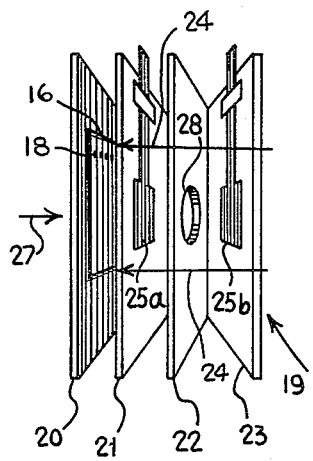
FIG. 4 is a perspective exploded view of a typical contact switching element for each key of the keyboard-display combination of FIG. 1.

The keyboard-display screen 11 is constructed of four contiguous, flexible panels or layers 20, 21, 22, and 23, respectively, as shown in FIGS. 2 and 4. Panels 21, 22, and 23 are transparent, while panel 20 is substantially opaque except for illuminative portions 16 and 18. Each key 15 has its own contact switch 19, which comprises two electrical conductors 25a and 25b, which are normally spaced-apart to prevent electrical contact, by panel 22. Conductor 25a is supported by panel 21, and conductor 25b is supported on panel 23. Panel 22 has an aperture 28 through which conductor 25a can project in order to electrically contact conductor 25b.

When a key 15 is depressed by the operator's finger, as depicted by arrow 27 (FIGS. 2 and 4), flexible layer 20 will push against layer 21. Flexible layer 21 will be forced to deflect, in turn, causing conductor 25a to project through aperture 28 into electrical contact with conductor 25b.

Figure 3:
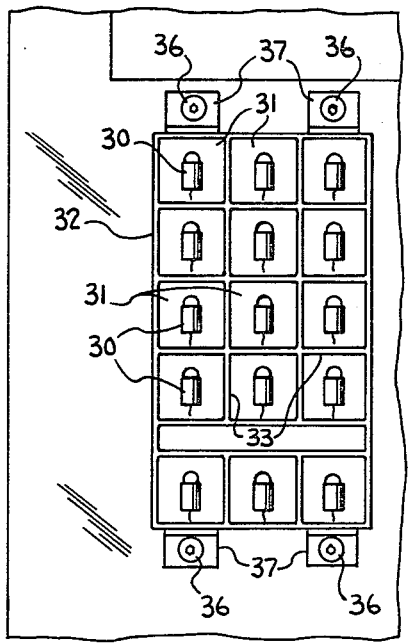
FIG. 3 is a front view of the lamp nesting structure disposed behind the keyboard-display combination of FIG. 1.

Each key 15 has a lamp 30, which will back-light it upon screen 11 by projecting light (arrows 24) across transparent panels 21, 22, and 23 to illuminate silhouette 16 and label 18 on opaque panel 20. Lamps 30 are each mounted in a cell 31 of a partitioned cage 32. The partitions 33 of the cage 32 form the cells 31 for each lamp, as shown in FIGS. 2 and 3.

Screen 11 is mounted to the frame 35 of the machine via stud fasteners (not shown). Stud fasteners 36 serve to secure the cage 32 of lamps behind the screen 11 via flanges 37 to frame 35.

Partitions 33 serve to direct and conserve the light from each lamp 30, so as to brightly illuminate each respective key 15. The light beam from each lamp (arrows 24) projects around conductors 25a and 25b on panels 21 and 23, respectively. These conductors are generally smaller than silhouette 16 and label 18, so as to allow substantial illumination for each key 15.

Figure 5:
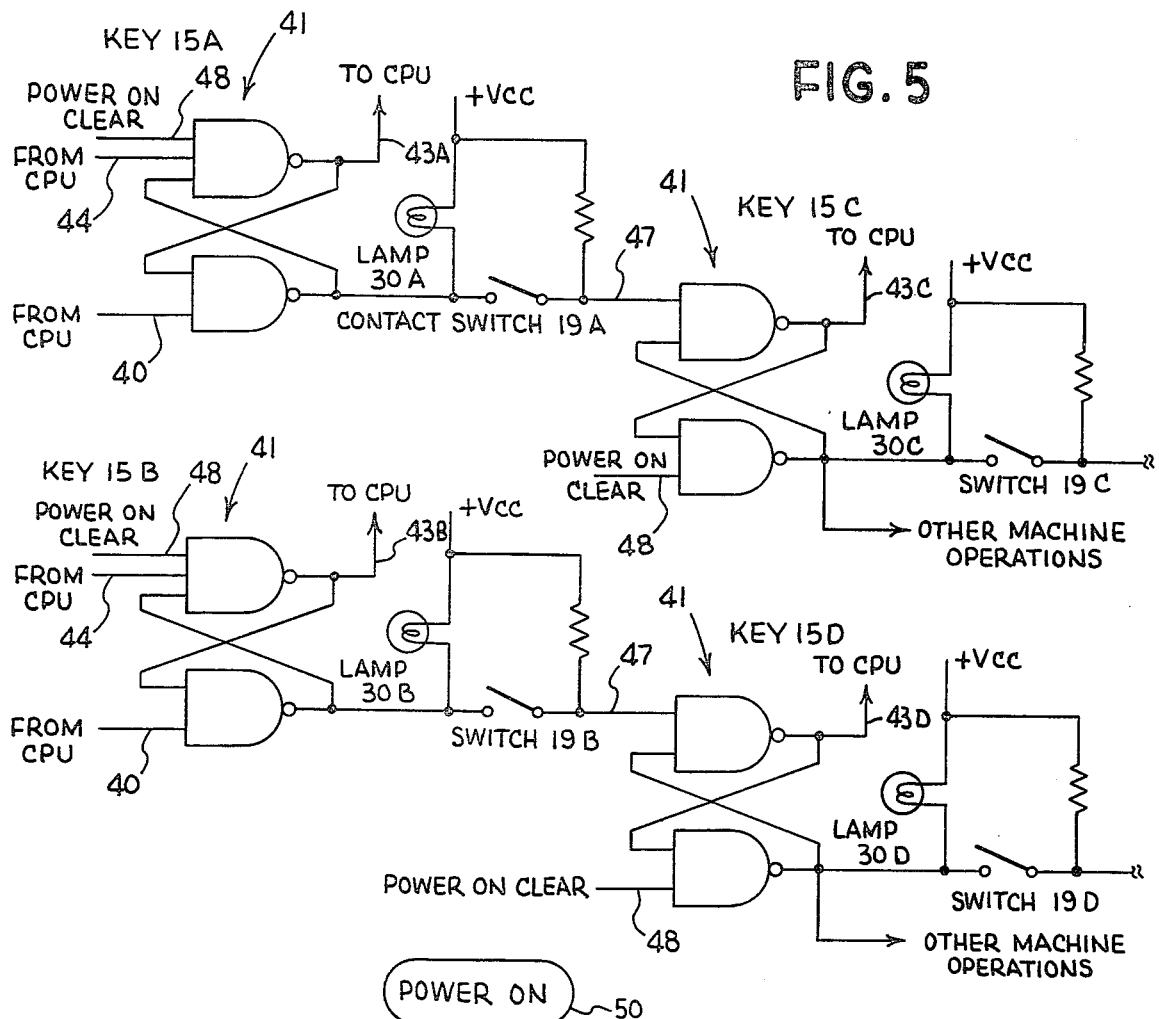
FIG. 5 is an electrical schematic for the keyboard-display combination of FIG. 1.

Referring now to FIG. 5, an electrical schematic for four typical keys 15A, 15B, 15C, and 15D of the invention is shown each including a flip-flop circuit 41, lamp 30, and contact switch 19. Certain keys 15A and 15B are controlled by a message (electrical byte) received from a central processor unit (CPU) of the machine. The electrical byte will be received on line 40 of these keys, and will enable respective flip-flops 41. This electrical byte signal will also turn on the lamps 30A and 30B of respective keys 15A and 15B. This is accomplished by completing the electrical circuit of $+V_{cc}$ which will now actuate each lamp 30A and 30B, respectively.

Closure of contact switch 19A will direct an initiating signal along line 47 to be carried to the flip-flop 41 of key 15C to enable key 15C. Likewise, closure of contact 19B will enable the flip-flop 41 of key 15D via line 47. Each flip-flop 41 is initially powered and cleared by a CPU signal carried upon line 48. When contact switch 19A or 19B is closed, the lamps 30A and 30B, respectively, may be extinguished. In which case, the flip-flops 41 will be disabled, i.e., keys 15A and 15B will become disabled. This would be accomplished by a signal which is sent back to the CPU via line 43C or 43D. The CPU would now send back a signal via line 44 to disable flip-flops 41 of keys 15A and 15B. The signal directed to the CPU along line 43 will also initiate the desired system function requested by the depressed key 15A or 15B.

Figure 6:
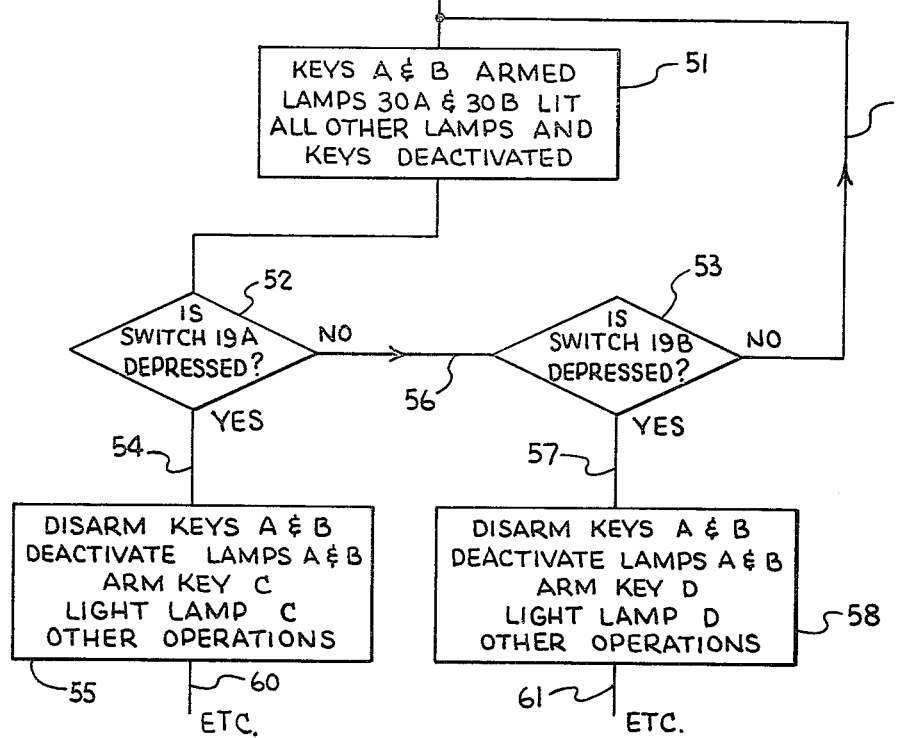
FIG. 6 is a flow diagram of computer instructions to operate the keyboard-display combination of FIG. 1.

A typical diagram for the operation of the typical keys 15A, 15B, 15C, and 15D is illustrated in FIG. 6. The CPU initially powers the keys 15A and 15B via block 50, and enables these keys and lamps 30A and 30B via block 51. The CPU will now interrogate contact switch 19A via block 52, to determine if this switch is closed. If switch 19A is closed, block 52 is exited via line 54, and block 55 is entered. This will disable keys 15A and 15B, enable key 15C and light lamp 30C. If switch 19A is open, block 52 is exited via line 56, and contact switch 19B is interrogated via block 53. If switch 19B is closed, block 53 is exited via line 57 and block 58 is entered. Keys 15A and 15B are disabled, key 15D is enabled, and lamp 30D is lit. If switch 19B is open, block 53 is exited on line 59, which makes a return loop to block 51 for arming keys 15A and 15B.

Either respective blocks 55 and 58 can be exited via respective lines 60 and 61 to continue the operating program or initiate other keys.

In summary, the depression of any enabled key 15, will initiate at least three functions: (a) initiate a systems function; (b) enable a new set of keys; and (c) light the lamps of the newly enabled keys. (The newly enabled keys may contain keys which are already enabled.) Thus, the above-described keyboard-display combination takes the "guesswork" away from the opeator of the machine by enabling only proper keys in an operating sequence. The operator is prevented from activating an improper key, because it is not enabled, and the operator cannot see the improper key (lamp is not lit).

While pressure contact switches 19 have been described and illustrated for the invention, other switches can be used such as capacitive or heat sensing contact switches. Therefore, if these other types of switches are used, the panels 20, 21, 22, and 23 may or may not be needed, or may not have to be flexible.

It should be realized, that the order or sequence of switch activation, key enabling or disabling, and associated lamp lighting or extinguishing, is arbitrary and dependent upon system objectives and controls. Depression of a particular switch 19 may or may not disable its associated key 15. Therefore, the methods of key actuation described herein are exemplary, and are meant to only provide a teaching of how an intended system may be operated. Naturally, those skilled in the art would also know that other electronics or computer controls may be used to provide the intended purposes of the system, in accordance with the inventive teachings.

The spirit and scope of this invention, for which Letters Patent is sought, should naturally be interpreted with respect to the appended claims.

What is claimed is:

1. A keyboard-display arrangement in combination with a controlled system capable of performing a plurality of system functions, comprising:

a flexible screen having extended upper and lower surfaces;

a series of keys which are functionally and structurally integral with said screen and disposed in an array, each of said keys being substantially invisible when disabled and visible when enabled at said upper surface of said screen, each of said keys being operative to initiate a particular system function and comprising a contact switch responsive to and actuated upon depression of a corresponding surface portion of said screen, said controlled system being responsive to each of said keys, as selectively actuated, to initiate said particular system function;

first means for enabling selected ones of said keys;

means for rendering said enabled keys visible at said upper surface of said screen; and second means responsive to said keys, as selectively actuated, for controlling said first means to enable others of said keys operative to initiate other system functions in proper sequence with said particular system function by a selected one of said keys and for disabling remaining ones of said keys.

2. The keyboard-display combination of claim 1, wherein said rendering means comprises individual lamps corresponding to each of said switches, said lamps being housed within a partitioned cage disposed adjacent said lower surface of said screen.

3. The keyboard-display combination of claim 1, wherein said surface defines a plurality of illuminative portions corresponding to said keys, each of said keys comprising a label which is visible at said corresponding surface portion when said key is enabled.

4. The keyboard-display combination of claim 3, wherein said screen comprises a plurality of panels, a first panel defining said illuminative portions, and three contiguous panels comprising said contact switches.

5. The keyboard-display combination of claim 4, wherein said three contiguous panels comprise two panels comprising conductors and separated by a spacer panel having a plurality of apertures wherein said conductors on said two panels can contact.

6. A keyboard-display in combination with a controlled system capable of performing a plurality of system functions, comprising:

a screen having an extended upper and lower surface;

a plurality of keys disposed in an array in close adjacency to said lower surface of said screen, said keys being substantially invisible at said upper surface of said screen when disabled, each of said keys being operative to initiate a corresponding system function, each of said keys comprising an illuminative identification area, said controlled system being responsive to each of said keys, as selectively operated, to initiate said corresponding system function;

first means for selectively enabling one or more of said keys in accordance with particular system operations to be performed by said controlled system;

means for illuminating said identification areas of said enabled keyes, so as to be visible at said upper surface of said screen;

means responsive to enabled ones of said keys, when operated, for controlling said system to perform in said corresponding system functions; and means responsive to said enabled keys, when operated, for controlling said first means to selectively enable others of said keys corresponding to other system functions to be performed in proper sequence with said system function being performed by said system and for disabling remaining ones of said keys.

7. The keyboard-display combination of claim 6, wherein said keys comprise illuminative areas disposed upon said screen.

8. The keyboard-display combination of claim 6, wherein said plurality of keys comprises a plurality of contact switches.

9. The keyboard-display combination of claim 8, wherein said contact switches comprise conductors mounted upon panels, said panels being separated by a spacer panel having apertures disposed therein for allowing contact between said conductors.

10. The keyboard-display combination of claim 6, wherein said illuminating means comprise a plurality of lamps, each lamp being associated with a respective key, said lamps being housed within a partitioned cage disposed over the lower surface of said screen.

* * * * *